United States Patent
Budesinsky et al.

[11] 3,907,797
[45] Sept. 23, 1975

[54] 5-(3-IODINEPROPARGYLOXY)PYRIMIDINES

[75] Inventors: Zdenek Budesinsky; Vladimir Janata; Alois Svab; Ladislav Bruna; Alois Capek; Antonin Simek, all of Prague, Czechoslovakia

[73] Assignee: SPOFA, United Pharmaceutical Works, Prague, Czechoslovakia

[22] Filed: Dec. 14, 1972

[21] Appl. No.: 314,991

[30] Foreign Application Priority Data
Dec. 15, 1971  Czechoslovakia ............... 08609-71

[52] U.S. Cl. ............................ 260/251 R; 424/251
[51] Int. Cl. ............................................. C07d 51/36
[58] Field of Search ................................ 260/251 R

[56] References Cited
UNITED STATES PATENTS
3,778,441  12/1973  Burckhardt et al. ............... 260/290

OTHER PUBLICATIONS
Patai, "Chemistry of the Ether Linkage," 1967, Interscience Publishers, p. 448.
Piganiol, "Acetylene Homologs and Derivatives," 1950, Mapleton House, N.Y., pp. 215–216.
Babor et al., "Introduction to College Chemistry," 2nd Edition, 1950, T. Y. Crowell Co., N.Y., p. 483.

*Primary Examiner*—Donald G. Daus
*Assistant Examiner*—Raymond V. Rush

[57] ABSTRACT

(Iodinepropargyloxy)-pyrimidines of the general formula

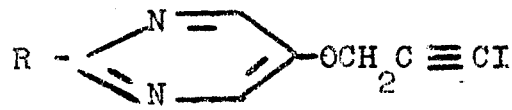

wherein R is selected from among hydrogen, alkyl, alkoxy, alkylthio, alkylsulfinyl and alkylsulfonyl radicals are described, and a process for the preparation thereof. The compounds are antibiotic and antimycotic agents.

10 Claims, No Drawings

5-(3-IODINEPROPARGYLOXY)PYRIMIDINES

The invention relates to 5-(3-iodinepropargyloxy)-pyrimidines of formula I

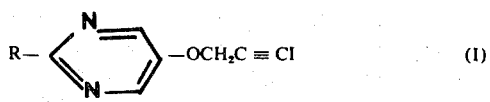 (I)

wherein R is hydrogen, an alkyl, alkoxy, alkylthio, alkylsulfinyl, or alkylsulfonyl group with 1 to 14 carbon atoms, or a benzylthio group, as well as to a process for producing these compounds.

The literature of the state of the art shows that 3-iodinepropargylaryl- and 3-iodinepropargylbenzylether, have antimicrobic effects.

It has now been established that analog ethers derived from 5-hydroxypyrimidine, that is, 5-(3-iodinepropargyloxy)pyrimidines of formula I above, when compared with known compounds, have substantially strong antimycotic effects. The antimycotic effectivity spectrum is very broad and covers pathogenic as well as saprophytic lower fungus (micro fungus, for example, phycomycetes, mycomycetes and deuteromycetes) that is molds and yeast fungi and micro organisms which resemble yeast fungi. By means of their antimycotic effectiveness and because of the breadth of the spectrum some of the new compounds surpass the most effective synthetic antimycotic and antibiotic compounds, such as Griseofulvine, Nystatine, and Amphotericine, and show furthermore a killing effectiveness against trichomonas vaginalis and trichomonas foetus. These compounds have very little toxicity and cause only slight irritation of the skin. For example after peroral administration of 2-methylthio-5-(3-iodinepropargyloxy) pyrimidine to white mice and rats in a dosage of 3.0 g/kg none of the animals died and after a twenty-one day application of a 0.1% solution of this material in 70% ethanol on to the earcap of rabbits no macroscopic or histologic signs of irritation could be observed.

According to the invention the new 5-(3-iodinepropargyloxy)-pyrimidines of formula I are prepared by a method which uses the 5-hydroxypyrimidine derivative having formula II

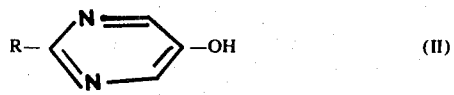 (II)

wherein R represents the same substituents as in Formula I, and the hydroxy compound is alkylated with a propargylhalogen, preferably a propargylbromide; thereafter the product formed is iodized in the 3-position of the propargyl chain.

The above mentioned alkylation with a propargylhalide can be carried out advantageously in an organic solvent medium, such as acetone, tetrahydrofurane, dioxane, acetonitrile or dimethylformamide in the presence of a compound which binds the hydrogen halide formed in particular an anhydrous alkali-metal-carbonate; the alkylation is carried out at the boiling temperature of the reaction mixture.

The subsequent iodizing of the 5-propargyloxylpyrimidine derivatives is best carried out with elemental iodine, in an alkanol having 1 to 3 carbon atoms, in the presence of an aqueous alkali metal hydroxide solution.

For alkylating the 5-hydroxypryimidine derivatives of formula II there can also be used a 3-iodinepropargylhalide; this path is, however, not particularly advantageous, since the required alkylation reactant is difficult to obtain. The direct iodization as set forth in the Examples below is simpler and more convenient.

The Examples are presented below as illustrative embodiments only and it is in no way intended to limit the invention specifically thereto.

EXAMPLE 1

To a solution of 4.9 g of 2-methylthio-5-hydroxypyrimidine and 4.4 propargylbromide in 80 ml of acetone, there is added 5.2 g of anhydrous calcium carbonate; the reaction mixture is boiled with stirring for 12 hours under reflux. Thereafter the separated inorganic salt is filtered off and the filtrate is evaporated to dryness. The residue is dissolved in 100 ml ether, and the solution agitated first with a 5% sodium hydroxide solution and then with water. After the extract is dried with anhydrous magnesium sulfate, the ether is distilled away and the residue recrystallized from methanol. The crystalline 2-methylthio-5-propargyloxypyrimidine obtained melts at a temperature of 85° to 87°C.

To a solution of 3.8 g 2-methylthio-5-propargyloxypyrimidine in 35 ml ethanol there is added simultaneously with stirring, 26.5 ml of a 10% aqueous solution of sodium hydroxide and 7.15 g of iodine while maintaining by exterior cooling the temperature of the reaction mixture between 15° to 20°C. Thereafter stirring is continued for from 1 to 2 hours and finally the reaction mixture is allowed to cool in the refrigerator. The separated product is filtered off and is washed with 50% ethanol. The 2-methyl-thio-5-(3-iodinepropargyloxy)pyrimidine obtained melts, after recrystallization from ethanol, at a temperature of 138° to 141°C.

EXAMPLE 2

To a solution of 36.4 g of 2-mercapto-4-hydroxy-5-methoxy pyrimidine in 275 ml of a 15% aqueous sodium hydroxide solution there is added with strong stirring 35.3 g of diethylsulfate and the reaction mixture is heated slowly to 85°C. After heating for 3 hours the reaction mixture is acidified with hydrochloric acid at a pH 2 to 3 and this mixture is cooled. The separated product is filtered off and washed with water. After recrystallization from water the product of 2-ethylthio-4-hydroxy-5-methoxy pyrimidine obtained melts at a temperature of 140°C.

A mixture of 31.8 g of 2-ethylthio-4-hydroxy-5-methoxypyrimidine and 96 ml of phosphoroxychloride is boiled for 3 hours with refluxing. Thereafter the excees phosphoroxychloride is evaporated under reduced pressure and the reflux mixture is stirred with chipped ice. The separated product is extracted four times, each time with 50 ml chloroform, the extract is dried with magnesium sulfate and is evaporated to dryness. The residue is dissolved in 650 ml ethanol and by addition of water there is separated the crystalline 2-ethylthio4-chloro-5-methoxy pyrimidine which melts at a temperature of 66° to 67°C.

In a mixture of 300 ml of water, 150 ml ethanol and 7.5 ml of ammonium tartrate there is boiled 15 g of 2-ethylthio-4-chloro-5-methoxy pyrimidine and 60 g of zinc powder with stirring. After 4 hours the zinc powder is filtered off and the filtrate is evaporated to about one-third of the output volume. The residue is extracted with chloroform and the chloroform extract after drying with calcium chloride is evaporated. The residue is distilled under vacuum. The 2-ethylthio-5-methoxy pyrimidine obtained boils at a temperature of 86° C 0.4 Torr.

In an autoclave a mixture of 2-ethylthio-5-methoxy pyrimidine 9 ml of ammonium tartrate and 5 ml water is heated for 6 hours at 180°C. The unconverted 2-ethylthio-5-methoxy pyrimidine is removed from the reaction mixture by shaking the mixture with chloroform and the aqueous solution is acidified with dilute hydrochloric acid. The separated 2-ethylthio-5-hydroxy-pyrimidine is filtered off and washed with water. After recrystallization from the water this product melts at a temperature of 119° to 120°C.

A mixture of 1.08 g of 2-ethylthio-5-hydroxypyrimidine, 0.88 g of propargylbromide, 1.05 g of anhydrous potassium-carbonate and 16 ml of acetone is boiled with stirring for 11 hours under a reflux. Thereafter the separated inorganic salt is filtered off, the filtrate is evaporated and the residue dissolved in ether. The ether solution is agitated with 5% ammonium tartrate and with water and is then dried with magnesium sulfate; after filtration, the filtrate is evaporated to dryness. The 2-ethylthio-5-propargyloxy pyrimidine obtained melts, after recrystallization from ethanol, at a temperature of 119° to 120°C.

To a solution of 1.1 g 2-ethylthio-5-propargyloxy pyrimidine in 50 ml ethanol there is added 7.2 ml of a 10% aqueous sodium hydroxide solution and with stirring 1.94 g of ground iodine is added. After one-half hour stirring, the separated crystalline product is filtered off, obtaining 2-ethylthio-5-/3-iodinepropargyloxy/pyrimidine; melting point, 110°C.

EXAMPLE 3

A solution of 31.6 g 2-mercapto-4-hydroxy-5-methoxypyrimidine is mixed in 500 ml ethanol with a sodium ethylate solution, made from 9.2 g sodium and 150 ml ethanol. Thereafter 27 g propylbromide is added and the reaction mixture boiled for 3 hours under reflux. The separated inorganic salt is filtered off while hot and the filtrate is evaporated to dryness. The residue is dissolved in as small an amount possible of water and after decoloration with activated charcoal the solution is acidified with dilute hydrochloric acid. The separated 2-propylthio-4-hydroxy-5-methoxy pyrimidine is filtered off and washed with water and shows FP 143° to 144°C.

A mixture of 30 g 2-propylthio-4-hydroxy-5-methoxy pyrimidine and 90 ml of phosphoroxychloride is boiled for three hours with reflux. The excess phosphoroxychloride is distilled off and the residue is disintegrated with ice. The separated oily product is extracted with chloroform, and after being washed with water and dried with calcium chloride, the chloroform is evaporated and the residue is fractionated under reduced pressure. The 2-propylthio-4-chlor-5-methoxypyrimidine obtained appears in the form of an oil having a boiling point of 110°C/0.4 Torr.

A mixture of 20 g 2-propylthio-4-chloro-5-methoxypyrimidine, 80 g of zinc powder, 10 ml of ammonium tartrate, 200 ml of ethanol and 400 ml water is boiled with stirring for 5 hours under reflux. The insoluble residue is filtered off while the mixture is still hot, the filtrate is vaporized to dryness and then the residue is extracted with chloroform. The chloroform extract is dried with calcium chloride, the chloroform is then evaporated and the residue is distilled under reduced pressure. The 2-propylthio-5-methoxypyrimidine obtained forms a colorless oily liquid having a boiling point of 100° to 105°C/0.6 Torr.

In an autoclave 3 g of 2-propylthio-2-methoxypyrimidine is heated with 9 ml of ammonium tartrate for 6 hours at 180°C. Thereafter the reaction mixture is agitated with chloroform and the aqueous layer is acidified with a dilute hydrochloric acid of pH 5. The separated 2-propylthio-5-hydroxypyromidine melts after precipitation with dilute ammonium tartrate at 101° to 102°C.

A mixture of 0.8 g 2-propylthio-5hydroxy pyrimidine, 0.6 g propargylbromide, 0.71 g anhydrous potassium carbonate and 13 ml of acetone is boiled with stirring for 8 hours with refluxing. Thereafter the separated inorganic salt is filtrated off, the filtrate is evaporated to dryness and the residue is dissolved in 50 ml of ether. The ether solution is agitated with 5% ammonium tartrate twice, each time with 20 ml of solution, with water, and thereafter is dried with magnesium sulfate and is evaporated to dryness. The 2-propylthio-5-propargyloxypyrimidine is obtained in the form of a dark brown oil which can be further processed without purification.

To a solution of 0.8 g of crude 2-propylthio-5-propargyloxypyrimidine in 35 ml of methanol there is added slowly with stirring first 4.8 ml of 10% aqueous sodium hydroxide solution and thereafter 1.3 g of ground iodine. It is necessary to stir for one hour at 20C; thereafter there is added dropwise 3 ml water, thereby causing a separation of the 2-propylthio-5-(3-iodinepropargyloxy)pyrimidine which is filtered off and washed with 50% methanol, FP 90°C.

EXAMPLE 4

A mixture of 2.0 g 2-n-butylthio-5-hydroxy pyrimidine, 25 ml of acetone, 1.39 g propargylbromide and 1.64 g of anhydrous potassium carbonate is boiled with stirring for 10 hours under reflux. Thereafter the undissolved portion is filtered off and the filtrate evaporated. The dark brown residue is dissolved in 50 ml of ether and the solution is agitated three times, each time with a 20 ml portion of a 5% sodium hydroxide solution and twice with the same volume of water. The thus treated ether solution is dried with anhydrous magnesium sulfate and is evaporated. The residue is dissolved in 50 ml ethanol and the solution is decolorized with activated charcoal. The filtrate is separated by distillation from the ethanol and the oily 2-n-butylthio-5-propargyloxy pyrimidine is further processed in crude form.

To a solution of 1.63 g of the above described material in 20 ml of ethanol there is added in drop-wise manner 2.6 g iodine with slow stirring and with external cooling, there also being added simultaneously therewith 9.6 ml of a 10% sodium hydroxide solution. Thereafter the reaction mixture is stirred for 1 hour and then it is cooled in an ice bath. The separated 2-n-butylthio-5-(3-iodinepropargyloxy) pyrimidine is filtered off, washed with ice water, and recrystallized from methanol, FP 78°C.

EXAMPLE 5

To a solution of 3.0 g 2-methylsulfinyl-5-hydroxy-pyrimidine and 2.2 g of propargylbromide dissolved in 40 ml of tetrahydrofurane there is added 5.2 g of anhydrous potassium carbonate. The reaction mixture is boiled with stirring for 16 hours under reflux. Thereafter the separated inorganic salt is filtered off and the filtrate is evaporated under reduced pressure until dry. The residue is dissolved in 50 ml ether, and the solution thereafter with a 5% sodium hydroxide solution and then with water. After the extract is dried with anhydrous magnesium sulfate, the ether is distilled off and the residue is washed with acetone. The 2-methylsulfinyl-5-propargyloxy-pyrimidine obtained melts at 142°C.

There is added 1.75 g of iodine and 4.4 ml of a 10% aqueous solution of sodium hydroxide to a solution of 0.68 g 2-methylsulfinyl5-propargyloxy-pyrimidine in 50 ml of ethanol with stirring and cooling. Thereafter the reaction mixture is stirred for an additional hour and then there is added 20 ml water and the mixture is cooled to 5°C. The separated 2-methylsulfinyl-5-(3-iodinepropargyloxy)pyrimidine melts, after recrystallization from methanol, at 145° to 149°C.

EXAMPLE 6

To a solution of 0.56 g 2-methylsulfonyl-5-hydroxy-pyrimidine and 0.41 g of propargylbromide in 9 ml acetone there is added 0.49 g of anhydrous potassium carbonate and the reaction mixture is boiled under reflux. After 8 hours of boiling and filtering off the inorganic salts the filtrate is evaporated to dryness. The thus obtained crude 2-methylsulfonyl-5-propargyloxy-pyrimidine (Fp. 152° to 154°C) is further processed in the following reaction step.

In a solution of 0.37 g crude 2-methylsulfonyl-5-propargyloxy-pyrimidine in 100 ml methanol there is added 2.2 ml of a 10% aqueous sodium hydroxide solution and 0.59 g of ground iodine. Thereafter the mixture is stirred at room temperature for one-fourth hour, and the reaction mixture is diluted with 100 ml water. A major portion of the methanol is distilled off under reduced pressure. The separated product is filtered off and washed with water. After recrystallization from benzol the 2-methylsulfonyl-5-(3-iodinepropargyloxy)pyrimidine obtained melts at 148° to 150°C.

EXAMPLE 7

A mixture of 3.0 g 2-methylsulfinyl-5-hydroxy-pyrimidine, 2.2 g of propargylbromide and 5.2 g of anhydrous potassium carbonate is heated in 40 ml of tetrahydrofurane with stirring for 16 hours at 80°C. Thereafter the separated inorganic salts are filtered off and the filtrate is evaporated under reduced pressure until dry. The residue is dissolved in 50 ml of ether and the solution is agitated three times with three portions each of 10 ml of 5% sodium hydroxide solution and twice with an equal volume of water. The thus treated ether solution is dried with anhydrous magnesium sulfate and the product separated by distillation from the solution medium. The 2-methylsulfinyl-5-propargyloxy-pyrimidine obtained is, after washing with acetone, chromatographically homogenous and melts at 142°C.

A solution of 1.96 g of the above material in 20 ml of a 1 N ethanolic sodium ethylate solution is boiled for one hour under reflux. Thereafter the reaction mixture is neutralized with an ethanolic hydrochloric solution and after filtering it is allowed to crystallize. The separated crude product after being filtered off is washed with a little water and is used for further processing.

To a solution of 1.7 g of the above material in 20 ml of ethanol there is added drop-wise with stirring and cooling with ice water, 13 ml of a 10% sodium hydroxide solution and simultaneously there is introduced 3.4 g of iodine. Thereafter the mixture is stirred for an additional 2 hours at a temperature of 25° to 30°C and finally the solution is cooled in the refrigerator. The separated product is filtered off, thereafter washed with 20 ml of methanol and recrystallized from ethanol. There is obtained 2-ethoxy-5-/3-iodinepropargyloxy-pyrimidine with Fp 149°C.

EXAMPLE 8

In a manner analogous to that described in Example 1 there is produced from 5-hydroxypyrimidine a 5-propargyloxpyrimidine and it is transformed in its crude form in the manner similar to that described above into the corresponding 5-(3-iodinepropargyloxy)-pyrimidine Fp 157° to 159°C.

What is claimed is:

1. 5-(3-iodinepropargyloxy)pyrimidine of the formula

wherein R is selected from the group consisting of hydrogen, straight chain alkyl, alkoxy, alkylthio, alkyl sulfinyl, and alkylsulfonyl, each of 1 to 4 carbon atoms.

2. 2-methylthio-5-(3-iodinepropargyloxy)pyrimidine.

3. 2-ethylthio-5-(3-iodinepropargyloxy)pyrimidine 4. 2-propylthio-5-(3-iodinepropargyloxy)pyrimidine.

5. 2-butylthio-5-(3-iodinepropargyloxy)pyrimidine.

6. 2-methylsulfinyl-5-(3-iodinepropargyloxy)pyrimidine.

7. 2-methylsulfonyl-5-(3-iodinepropargyloxy)pyrimidine.

8. 2-ethoxy-5-(3-iodinepropargyloxy)pyrimidine.

9. 5-(3-iodinepropargyloxy)pyrimidine.

10. 5-(3-iodinepropargyloxy)pyrimidine of the formula

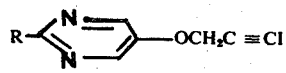

wherein R is a straight-chain alkylthio of 1–4 carbon atoms.

* * * * *